(12) United States Patent
Agata

(10) Patent No.: US 9,046,725 B2
(45) Date of Patent: Jun. 2, 2015

(54) DISPLAY DEVICE

(71) Applicant: Japan Display Inc., Tokyo (JP)

(72) Inventor: Kentaro Agata, Tokyo (JP)

(73) Assignee: JAPAN DISPLAY INC., Tokyo (JP)

( * ) Notice: Subject to any disclaimer, the term of this patent is extended or adjusted under 35 U.S.C. 154(b) by 40 days.

(21) Appl. No.: 14/034,883

(22) Filed: Sep. 24, 2013

(65) Prior Publication Data

US 2014/0092335 A1  Apr. 3, 2014

(30) Foreign Application Priority Data

Sep. 28, 2012 (JP) ................................. 2012-216160

(51) Int. Cl.
| | | |
|---|---|---|
| *G02F 1/1333* | (2006.01) | |
| *G02F 1/1345* | (2006.01) | |
| *G09G 3/00* | (2006.01) | |
| *G02F 1/1362* | (2006.01) | |

(52) U.S. Cl.
CPC ............ *G02F 1/13452* (2013.01); *G09G 3/006* (2013.01); *G02F 2001/136254* (2013.01)

(58) Field of Classification Search
CPC .............. G02F 1/136259; G02F 2001/136263; G02F 1/1309

USPC .......................................................... 349/192
See application file for complete search history.

(56) References Cited

U.S. PATENT DOCUMENTS

2011/0279746 A1   11/2011   Kim

FOREIGN PATENT DOCUMENTS

| JP | 2010-32800 A | 2/2010 |
|---|---|---|
| JP | 2011-242742 A | 12/2011 |

*Primary Examiner* — Phu Vu
(74) *Attorney, Agent, or Firm* — Lowe Hauptman & Ham, LLP

(57) ABSTRACT

Inspection pads are reduced when there is a need to input a plurality of control signals as inspection control signals. A display device includes: an integrated circuit; a first substrate on which a plurality of signal lines that respectively input the control signals to the integrated circuit, and an inspection pad are formed; and a driver circuit that that is mounted on the first substrate and connected to the plurality of signal lines. The plurality of signal lines include first and second signal lines adjacent to each other. The inspection pad is formed on the one signal line. The second signal line is connected to the inspection pad through a switch element. At the time of inspection, the switch element turns on, and the same control signal is input to the first and second signal lines from the inspection pad.

7 Claims, 10 Drawing Sheets

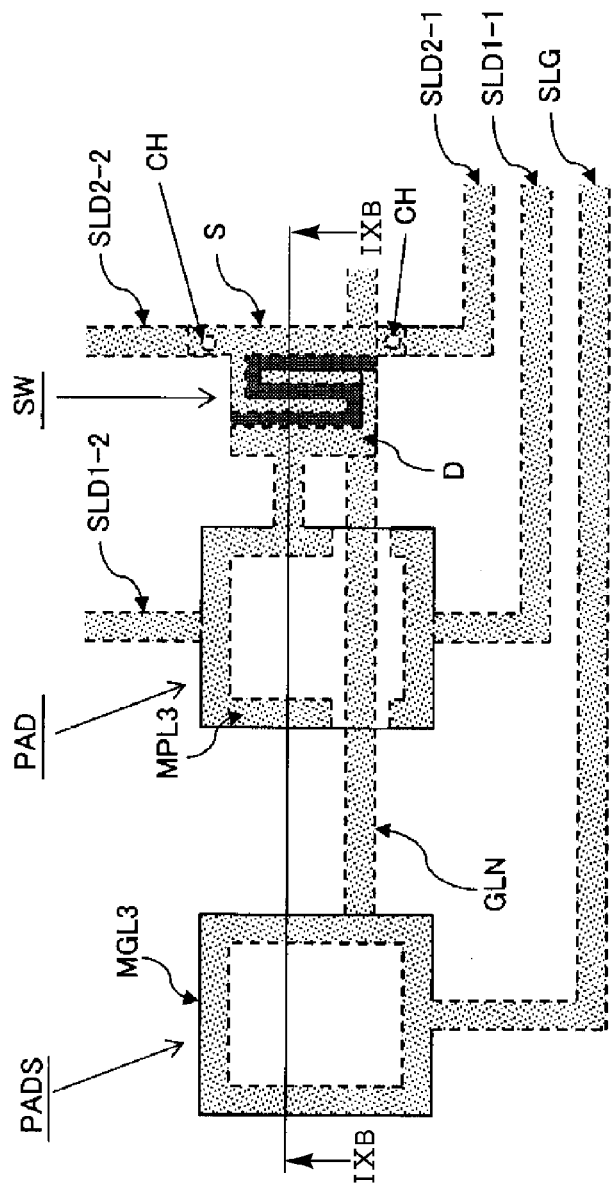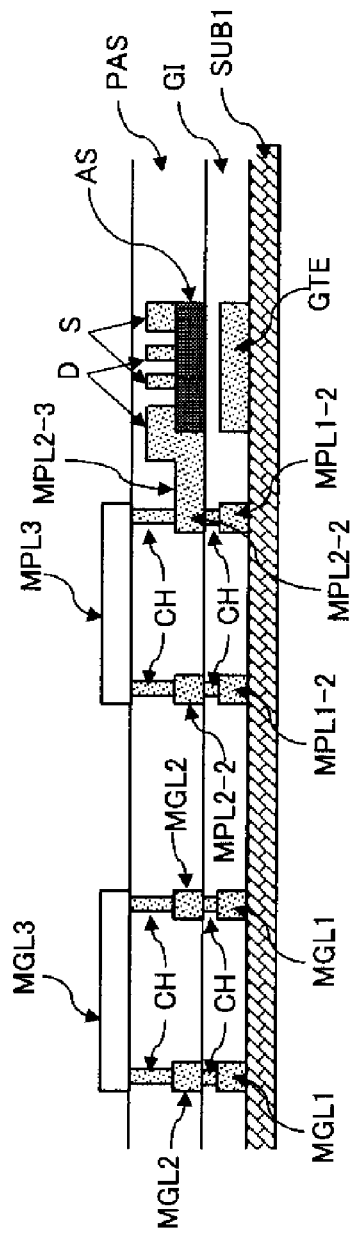
FIG.9A
FIG.9B

PRIOR ART

DISPLAY DEVICE

CROSS-REFERENCE TO RELATED APPLICATION

The present application claims priority from Japanese application JP 2012-216160 filed on Sep. 28, 2012, the content of which is hereby incorporated by reference into this application.

BACKGROUND OF THE INVENTION

1. Field of the Invention

The present invention relates to a display device, and particularly to a technique effective in reduction of the number of inspection pads.

2. Description of the Related Art

For example, because TFT liquid crystal display devices using thin film transistors as active elements can display high fine images, the TFT liquid crystal display devices are frequently used as display devices for televisions or personal computer displays.

The liquid crystal display device has a so-called liquid crystal display panel having a liquid crystal layer sandwiched between a first substrate and a second substrate (a pair of substrates) at least one of which is made of transparent glass. A voltage is selectively applied to various electrodes for pixel formation which are formed on the substrate(s) of the liquid crystal display device to turn on/off a given pixel, which is excellent in contrast performance and high speed display performance.

SUMMARY OF THE INVENTION

For example, in downsized liquid crystal display panels used for mobile phones or smartphones, there has been known a configuration in which a driver circuit (for example, a scanning line driver circuit) is incorporated into a liquid crystal display panel.

In the liquid crystal display panel having an integrated circuit therein, for example, when a lighting inspection of the integrated circuit is implemented, all of lighting inspection pad electrodes for probing must be arranged to each of signal lines for inputting a control signal to the integrated circuit.

However, there is a need to arrange an alignment mark or the like other than a driver circuit (DRV) in addition to the lighting inspection pad electrodes in an area of the first substrate which does not overlap with the second substrate. In the integrated circuit in which the number of input control signals is large, it is difficult to ensure an area in which all of the lighting inspection pad electrodes are arranged.

In order to solve the above problem, it is assumed to reduce the lighting inspection pad electrodes and to reduce the pitches therebetween. However, there arise such drawbacks that the reduction in the lighting inspection pad electrodes, and the reduction in the pitches lead to a degradation in throughput caused by deterioration of the probing precision, and an increase in the costs because of an increased difficulty in an inspection jig per se. JP 2011-242742 A and JP 2010-32800 A disclose that the transistors turn on at the time of lighting inspection, and the lighting inspection control signal is input to all of the signal lines to reduce the lighting inspection pad electrodes.

However, there is a need to input a plurality of control signals to the integrated circuit incorporated into the above-mentioned liquid crystal display panel as the lighting inspection control signals, and techniques disclosed in JP 2011-242742 A and JP 2010-32800 A cannot be applied to a case in which there is a need to input a plurality of lighting inspection control signals.

The present invention has been made to solve the problems with the related art, and therefore an object of the present invention is to provide a technique in which the inspection pad electrodes can be reduced when the plurality of control signals need to be input as the inspection control signals.

The above and other objects and novel features of the present invention will become apparent from the description of the present specification and the attached drawings.

Typical outlines of the invention disclosed in the present application will be described in brief as follows.

(1) A display device including an integrated circuit, a first substrate on which a plurality of signal lines that input control signals to the integrated circuit, and an inspection pads are formed, and a driver circuit that is mounted on the first substrate, and is connected to the plurality of signal lines, in which the plurality of signal lines include a first signal line and a second signal line adjacent to each other, the inspection pad is formed on the first signal line, the second signal line is connected to the inspection pad through a switch element, and at the time of inspection, the switch element turns on, and the same control signal is input to the first signal line and the second signal line from the inspection pad.

(2) In the item (1), the switch element is a thin film transistor formed on the first substrate, the first substrate further includes a gate voltage pad for inputting a gate voltage to be applied to a gate electrode of the thin film transistor, and a gate line that is connected to the gate voltage pad to apply the gate voltage to the gate electrode of the thin film transistor, and at the time of inspection, the gate voltage that turns on the thin film transistor is applied to the gate voltage pad to turn on the switch element.

(3) In the item (2), the gate voltage pad includes a first gate voltage conductive layer in a loop shape that is formed of a metal layer on the first substrate, a second gate voltage conductive layer in a loop shape that is formed of a metal layer on a gate insulating film, and is electrically connected to the first gate voltage conductive layer through a first contact hole, and a third gate voltage conductive layer in a planar shape that is formed of a transparent conductive layer on an interlayer insulating film, and is electrically connected to the second gate voltage conductive layer through a second contact hole, on the first substrate the first gate voltage conductive layer is connected with a signal line connected to the driver circuit, the gate line is formed of a metal layer connected to the first gate voltage conductive layer, and the gate line is formed under the inspection pad.

(4) In the item (3), the inspection pad includes: a first inspection conductive layer and a second inspection conductive layer each of that is formed of a metal layer on the first substrate, and both of that are configured so that parts of a loop as viewed from above are divided by the gate line; a third inspection conductive layer in a loop shape that is formed of a metal layer on the gate insulating film, and is electrically connected to a first inspection conductive layer and a second inspection conductive layer through a third contact hole; and a fourth inspection conductive layer in a planar shape that is formed of a transparent conductive layer on the interlayer insulating film, and is electrically connected to the third inspection conductive layer through a fourth contact hole, the first signal line is divided into first and second portions by the gate line, the first inspection conductive layer is connected to the first portion of the first signal line, which is connected to the driver circuit, and the second inspection conductive layer is connected to the second portion of the first signal line, which is connected to the integrated circuit.

(5) In the item (4), the thin film transistor includes: a gate electrode that is formed on the first substrate, and is electrically connected to the gate line; a semiconductor layer that is formed on the gate insulating film, and formed to cover the gate electrode; and a first electrode and a second electrode which are formed on the semiconductor layer, the second electrode is connected to the third inspection conductive layer, the second signal line is divided into first and second portions by the gate line, one end of the first electrode is connected with a the first portion of the second signal line which is connected to the driver circuit through a fifth contact hole, and the other end of the first electrode is connected with the second portion of the second signal line which is connected to the integrated circuit through a sixth contact hole.

(6) In the item (3), the inspection pad includes: a first inspection conductive layer and a second inspection conductive layer, each of that is formed of a metal layer on the first substrate, and both of that are configured so that parts of a loop as viewed from above are divided by the gate line; a third inspection conductive layer and a fourth inspection conductive layer that are formed of a metal layer on the gate insulating film, and are electrically connected to the first inspection conductive layer and the second inspection conductive layer through seventh and eighth contact holes, respectively, and are configured so that parts of a loop as viewed from above are divided by the gate line; and a fifth inspection conductive layer in a planar shape that is formed of a transparent conductive layer on the interlayer insulating film, and is electrically connected to the third inspection conductive layer and the fourth inspection conductive layer through a ninth contact hole, the first signal line is divided by the gate line, the first inspection conductive layer is connected to a signal line of a portion of the first signal line, which is connected to the driver circuit, and the second inspection conductive layer is connected to a signal line of a portion of the first signal line, which is connected to the integrated circuit.

(7) In the item (6), the thin film transistor includes: a gate electrode that is formed on the first substrate, and electrically connected to the gate line; a semiconductor layer that is formed on the gate insulating film, and formed to cover the gate electrode; and a first electrode and a second electrode which are formed on the semiconductor layer, in which the second electrode is connected to the third or fourth inspection conductive layer, the second signal line is divided by the gate line, one end of the first electrode is connected with a signal line of a portion of the second signal line which is connected to the driver circuit through a tenth contact hole, and the other end of the first electrode is connected with a signal line of a portion of the second signal line which is connected to the integrated circuit through an eleventh contact hole.

Advantages obtained by the typical features of the invention disclosed in the present application will be described in brief as follows.

According to the display device of the present invention, the number of inspection pads is reduced when there is a need to input a plurality of control signals as inspection control signals.

BRIEF DESCRIPTION OF THE DRAWINGS

FIGS. 9A and 9B are diagrams illustrating the manufacturing method of the lighting inspection pad electrode and the gate voltage pad electrode according to the embodiment of the present invention.

DETAILED DESCRIPTION OF THE INVENTION

Hereinafter, an embodiment of the present invention will be described in detail with reference to the accompanying drawings.

In all of the drawings for illustrating the embodiment, parts having the same function are denoted by identical symbols, and a repetitive description thereof will be omitted. Also, the following embodiment does not limit the interpretation of the claims of the present invention.

(Configuration of Liquid Crystal Display Device Serving as Basis of the Present Invention)

Figure 1:
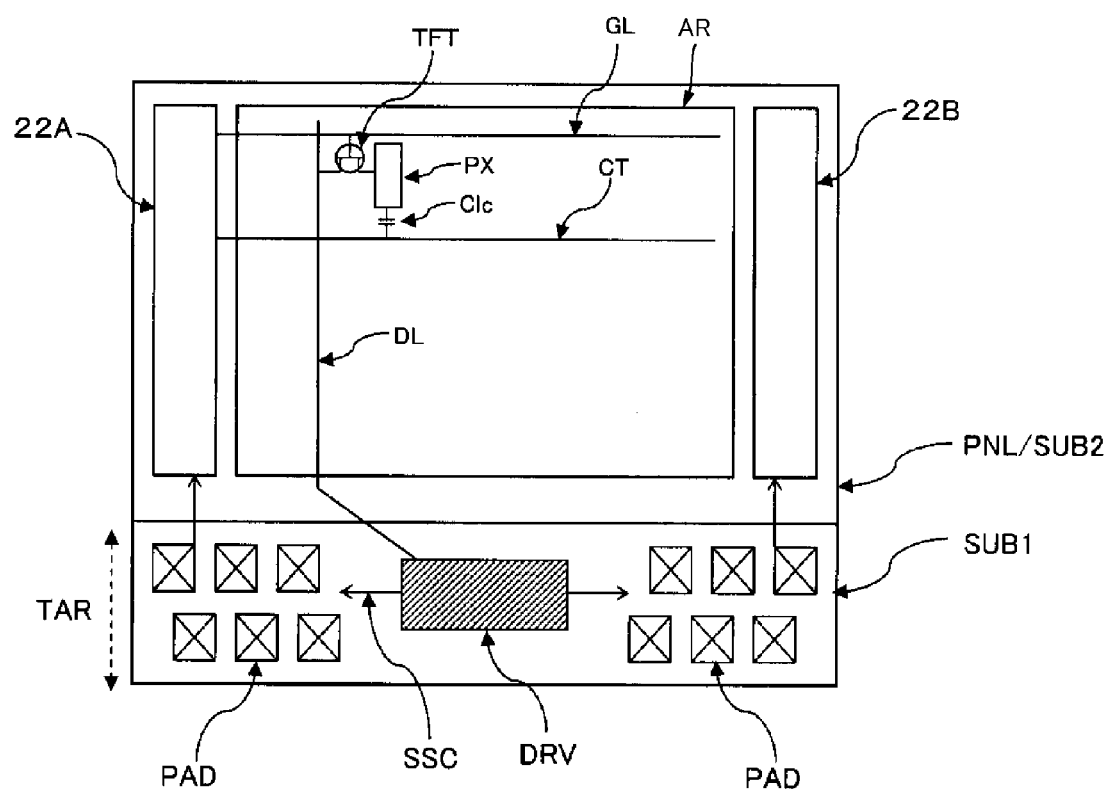
FIG. 1 is a block diagram illustrating an outline configuration of a liquid crystal display device serving as a basis of the present invention.

FIG. 1 is a block diagram illustrating an outline configuration of a liquid crystal display device serving as a basis of the present invention.

Referring to FIG. 1, reference symbol SUB1 denotes a first substrate (also called "TFT substrate"), and SUB2 is a second substrate (also called "CF substrate") smaller in size than the first substrate (SUB1).

A liquid crystal display panel (PNL) is configured so that the first substrate (SUB1) on which pixel electrodes (PX) and thin film transistors (TFT) are formed, and the second substrate (SUB2) on which color filters are formed, overlap with each other with a given gap therebetween, and both of those substrates are stuck to each other with a sealing member disposed into a frame shape in the vicinity of a peripheral portion between both of those substrates. Also, liquid crystal is encapsulated and sealed inside of the sealing member between both of those substrates from a liquid crystal inlet disposed in a part of the sealing member, and further polarization plates are respectively stuck on the outside of those substrates. Referring to FIG. 1, AR indicates a display area.

Reference symbols 22A and 22B denote integrated circuits (for example, scanning line driving, etc.) incorporated into the liquid crystal display panel (PNL), and DRV is a driver circuit formed of a driver IC. The integrated circuit is formed using thin film transistors (TFT) formed on the TFT substrate (first substrate), and the driver circuit is formed using a semiconductor chip, and a film (COF: chip on film) on which the semiconductor chip is mounted. The driver circuit (DRV) is mounted on an area (TAR in FIG. 1) of the first substrate (SUB1) which does not overlap with the second substrate (SUB2).

In the area (TAR) are also formed lighting inspection pad electrodes (PAD) that receive control signals for lighting inspection. In the normal operation, control signals are input to the integrated circuits (22A, 22B) from the driver circuit (DRV). In the lighting inspection, since the driver circuit (DRV) is not mounted, the control signals are input to the integrated circuits (22A, 22B) from the lighting inspection pad electrodes (PAD). In this example, the lighting inspection is illustrated. However, the present invention is not limited to the lighting inspection, but the present invention can be extensively applied to other continuity inspections or disconnection inspections. Note that a pad electrode is an example of a pad in this specification.

The liquid crystal display panel includes a plurality of sub-pixels R (red), G (green), and B (blue). The respective sub-pixels are disposed in areas surrounded by video lines (DL) and scanning lines (GL).

The respective sub-pixels have thin film transistors (TFT). A second electrode (one of a drain electrode and a source electrode) of each thin film transistor is connected to one of the video lines (DL), and a first electrode (the other of the drain electrode and the source electrode) of the thin film transistor is connected to one of the pixel electrodes (PX). Also, a gate electrode of each thin film transistor is connected to one of the scanning lines (GL).

Referring to FIG. 1, reference symbol Clc denotes a liquid crystal capacity equivalently indicating a liquid crystal layer arranged between each of the pixel electrodes (PX) and a counter electrode (CT). Also, a retentive capacity (Cstg) is also formed between the pixel electrode (PX) and the counter electrode (CT), which is omitted in FIG. 1.

Referring to FIG. 1, each of the video lines (DL) is connected to the driver circuit (DRV), and the scanning lines (GL) and the counter electrode (CT) are connected to the integrated circuits (22A, 22B).

When an image is displayed on the liquid crystal display panel (PNL), the integrated circuits (22A, 22B) sequentially select the scanning lines (GL) from the top to the bottom, or from the bottom to the top, and applies a select voltage for turning on the thin film transistors (TFT) for one horizontal scanning time.

On the other hand, the driver circuit (DRV) applies a gradation voltage corresponding to a display data voltage to the video line (DL) while a certain scanning line (GL) is being selected.

The gradation voltage applied to the video line (DL) is applied to the pixel electrode (PX) through the thin film transistor (TFT), and the liquid crystal capacity (Clc) and the retentive capacity (Cstg, not shown) are charged with electric charge, and liquid crystal molecules are controlled to display an image.

The counter electrode (CT) is disposed on the second substrate side in the case of a TN liquid crystal display panel or a VA liquid crystal display panel. The counter electrode (CT) is disposed on the first substrate side in the case of an IPS liquid crystal display panel.

Also, since the present invention is irrelevant to an internal structure of the liquid crystal display panel, a detail of the internal structure of the liquid crystal display panel will be omitted from the description. Further, the present invention can be applied to the liquid crystal display panel of any structure.

As described above, since the driver circuit (DRV) is not mounted in the lighting inspection, there is a need to input the control signals to the integrated circuits (22A, 22B) from lighting inspection pad electrodes (PAD). Hereinafter, in this example, the lighting inspection pad electrodes are described, however, the present invention can be extensively applied to other inspection pad electrodes.

Figure 10:
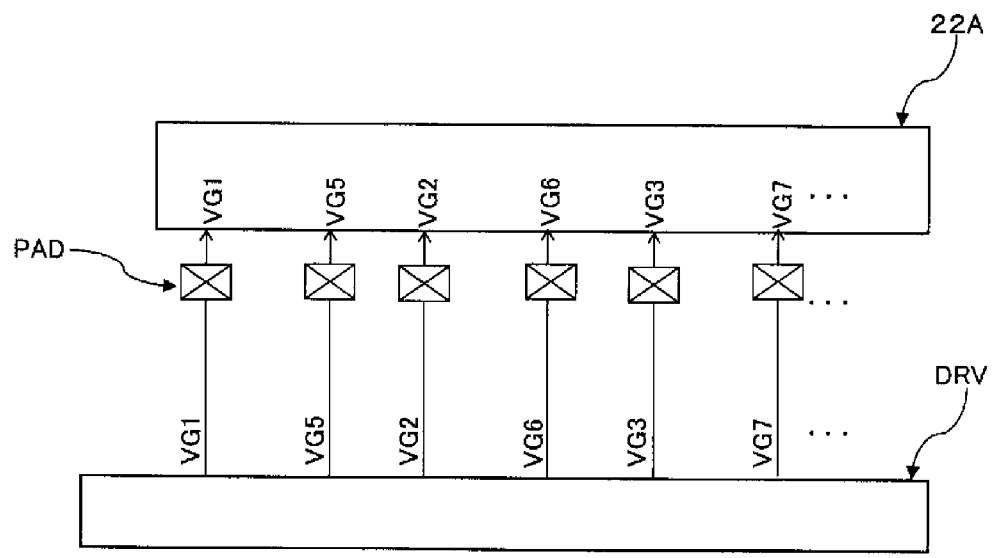
FIG. 10 is a diagram illustrating a connecting method between the integrated circuit and a driver circuit in a related art liquid crystal display device.

FIG. 10 is a diagram illustrating a connecting method between the integrated circuit 22A and the driver circuit (DRV) in the related art liquid crystal display device.

In general, clock signals of VG1 to VGn different in phase are input to the integrated circuits (22A, 22B) as the control signals. Symbol n is determined according to the specification of the integrated circuits (22A, 22B), but in this example, a description will be made with n=8.

As illustrated in FIG. 10, in the related art, all of eight clock signals different in phase need to be input to the integrated circuit 22A from the driver circuit (DRV) through the lighting inspection pad electrodes (PAD). In this case, eight of the lighting inspection pad electrodes (PAD) are required.

In this way, in the liquid crystal display panel (PNL) on which the integrated circuits (22A, 22B) are mounted, all of the lighting inspection pad electrodes (PAD) for inputting eight control signals (eight clock signals different in phase) must be arranged for the respective eight control signals in the lighting inspection.

However, in the area (TAR in FIG. 1) of the first substrate (SUB1) which does not overlap with the second substrate (SUB2) on which the lighting inspection pad electrodes (PAD) are arranged, the alignment mark, and the like are also arranged in addition to the driver circuit (DRV), and therefore there is a limit to the area (TAR). Therefore, when the integrated circuits (22A, 22B) have a large number of control signals input at the time of lighting inspection, there is really a worry that the area for arranging all of the lighting inspection pad electrodes (PAD) is ensured.

(Features of the Invention)

Figure 2:
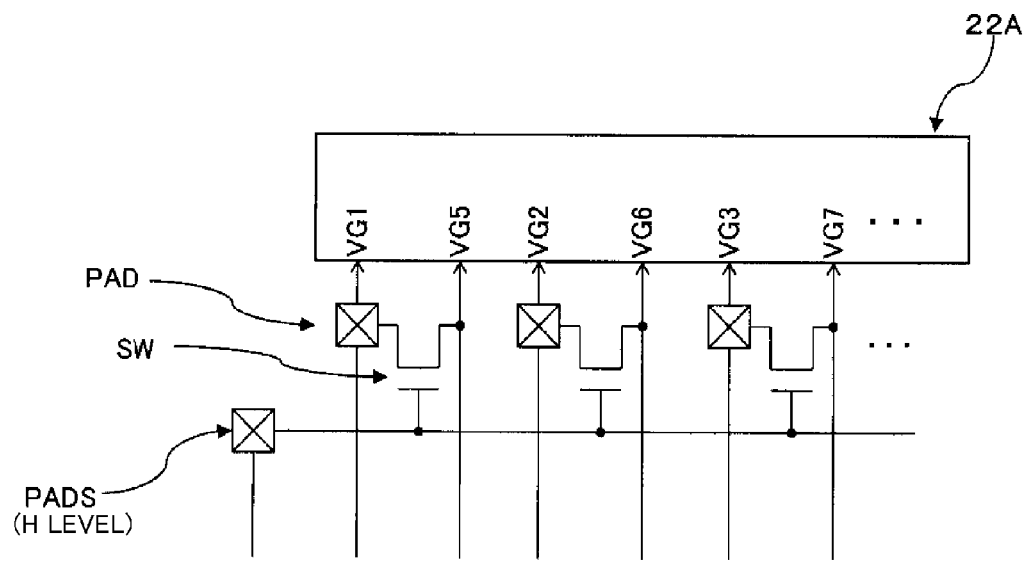
FIG. 2 is a diagram illustrating a technique for inputting a clock signal to an integrated circuit at the time of inspecting lighting according to an embodiment of the present invention.

FIG. 2 is a diagram illustrating a technique for inputting the clock signal to the integrated circuit 22A at the time of inspecting the lighting according to an embodiment of the present invention.

Figure 3:
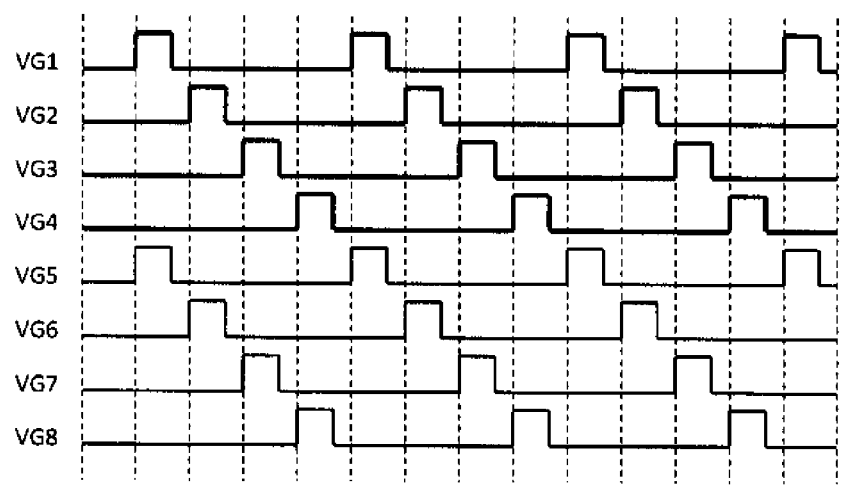
FIG. 3 is a diagram illustrating a waveform of the clock signal to the integrated circuit at the time of inspecting the lighting according to the embodiment of the present invention.

FIG. 3 is a diagram illustrating a waveform of a clock signal input to the integrated circuit 22A at the time of inspecting the lighting according to the embodiment of the present invention.

The lighting inspection can be conducted even if the clock signals VG1 and VG5, the clock signals of VG2 and VG6, the clock signals of VG3 and VG7, and the clock signals VG4 and VG8, which are respectively clock signals of the same phase, are input to the integrated circuits (22A, 22B), instead of the eight clock signals (VG1 to VG8) different in phase from each other.

Under the circumstances, as illustrated in FIG. 2, in this embodiment, the lighting inspection pad electrodes (PAD) are disposed on the signal lines through which the clock signals of VG1, VG2, VG3, and VG4 propagate. Also, switches (SW) are disposed between the four lighting inspection pad electrodes (PAD) and the signal lines through which the clock signals of VG5, VG6, VG7, and VG8 propagate.

As illustrated in FIG. 2, at the time of inspecting lighting, a gate voltage of a high level is input to a gate voltage pad electrode (PADS) to turn on the switches (SW), and the clock signals of VG1, VG2, VG3, and VG4 are input to the respective lighting inspection pad electrodes (PAD). As a result, as illustrated in FIG. 3, the clock signals having the same phase as that of the clock signals of VG1, VG2, VG3, and VG4 are input as the clock signals of VG5, VG6, VG7, and VG8.

Figure 4:
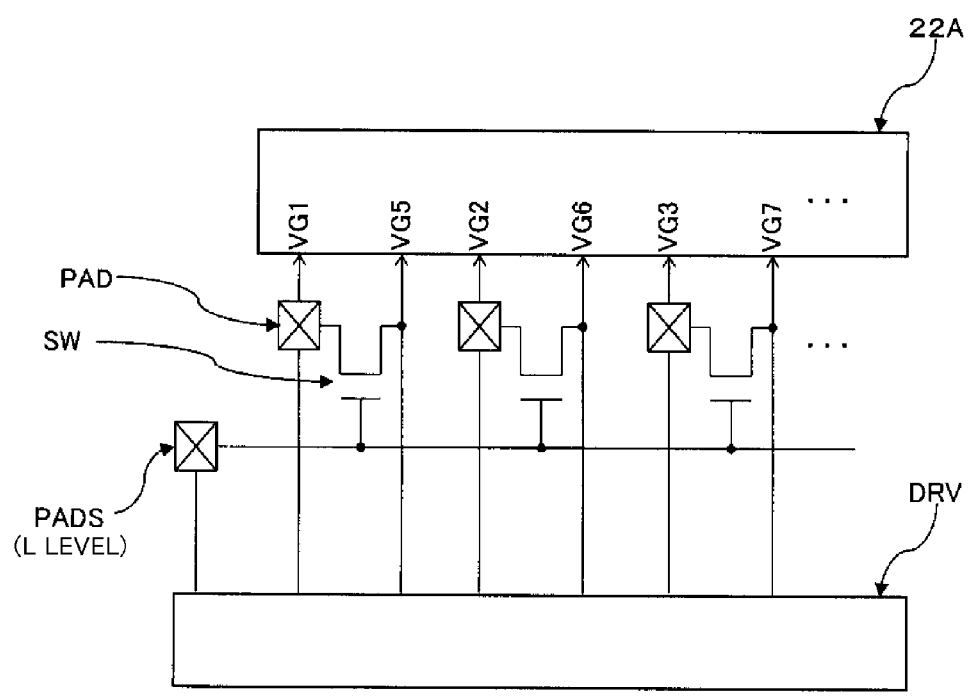
FIG. 4 is a diagram illustrating a technique for inputting the clock signal to the integrated circuit in a normal operation according to the embodiment of the present invention.

FIG. 4 is a diagram illustrating a technique for inputting the clock signal to the integrated circuit 22A in a normal operation according to the embodiment of the present invention.

Figure 5:
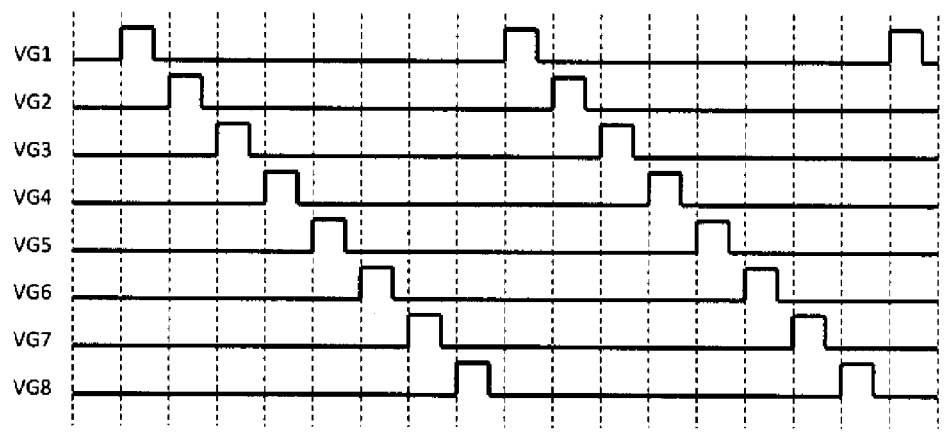
FIG. 5 is a diagram illustrating a waveform of the clock signal input to the integrated circuit in the normal operation according to the embodiment of the present invention.

FIG. 5 is a diagram illustrating a waveform of the clock signal input to the integrated circuit 22A in the normal operation according to the embodiment of the present invention.

As illustrated in FIG. 4, in the normal operation, a gate voltage of a low level is input to the gate voltage pad electrode (PADS) to turn off the switches (SW), and as illustrated in FIG. 5, the clock signals of VG1 to VG8 are input from the driver circuit (DRV).

In this way, in this embodiment, the number of lighting inspection pad electrodes (PAD) can be reduced to half of the related art while the lighting inspection is enabled.

Figure 6:
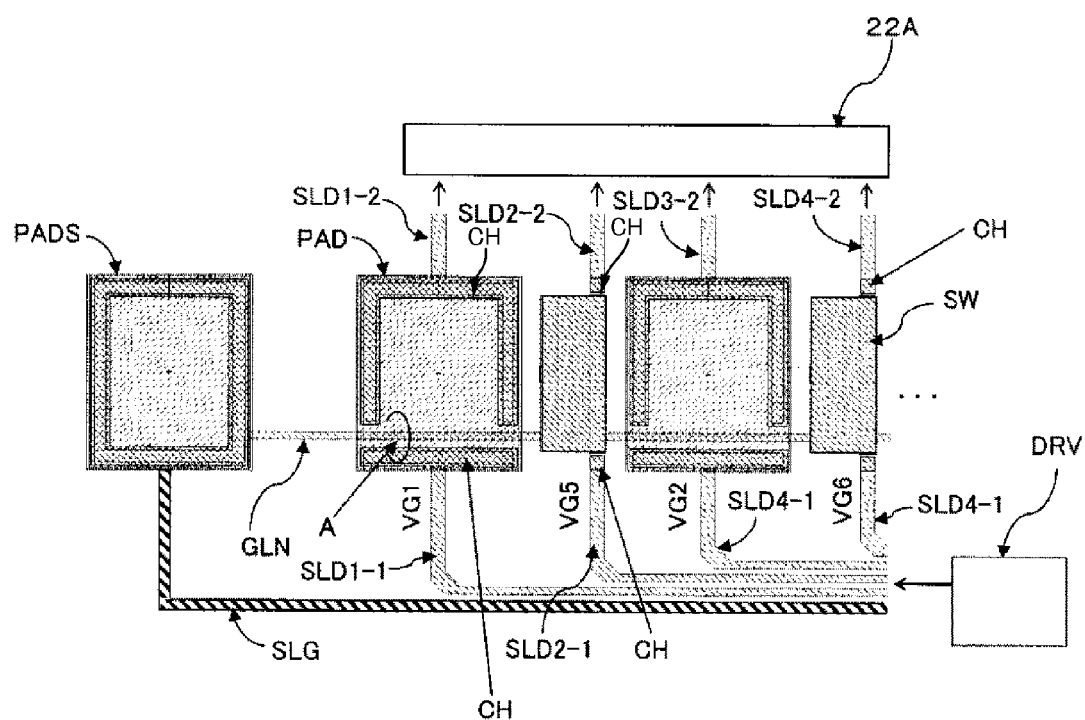
FIG. 6 is a plan view of a lighting inspection pad electrode and a gate voltage pad electrode according to the embodiment of the present invention.

FIG. 6 is a plan view of the lighting inspection pad electrodes (PAD) and the gate voltage pad electrode (PADS) according to the embodiment of the present invention.

As illustrated in FIG. 6, in this embodiment, a gate line (GLN) that applies a gate voltage to the gate electrodes of the thin film transistors configuring the switches (SW) is extended under the lighting inspection pad electrodes (PAD).

For that reason, a signal line through which the clock signal VG1 inputs from the driver circuit (DRV) to the integrated circuit 22A is divided into two lines of SLD1-1 and SLD1-2. Likewise, a signal line through which the clock signal VG5 inputs from the driver circuit (DRV) to the integrated circuit 22A is divided into two lines of SLD2-1 and SLD2-2. A signal line through which the clock signal VG2 inputs from the driver circuit (DRV) to the integrated circuit 22A is also divided into two lines of SLD3-1 and SLD3-2. A signal line through which the clock signal VG6 inputs from the driver circuit (DRV) to the integrated circuit 22A is also divided into two lines of SLD4-1 and SLD4-2.

Under the circumstances, in the normal operation, the clock signal of VG1 is input from the driver circuit (DRV) to the integrated circuit 22A through the signal line of SLD1-1, a contact hole (CH), an uppermost transparent conductive layer of the lighting inspection pad electrodes (PAD), a contact hole (CH), and the signal line of SLD1-2 in a stated order.

Likewise, in the normal operation, the clock signal of VG2 is input from the driver circuit (DRV) to the integrated circuit 22A through the signal line of SLD3-1, a contact hole (CH), an uppermost transparent conductive layer of the lighting inspection pad electrodes (PAD), a contact hole (CH), and the signal line of SLD3-2 in a stated order.

Also, in the normal operation, the clock signal of VG5 is input from the driver circuit (DRV) to the integrated circuit 22A through the signal line of SLD2-1, a contact hole (CH), the source electrode included in the switch (SW), a contact hole (CH), and the signal line of SLD2-2 in a stated order.

Likewise, in the normal operation, the clock signal of VG6 is input from the driver circuit (DRV) to the integrated circuit 22A through the signal line of SLD4-1, a contact hole (CH), the source electrode included in the switch (SW), a contact hole (CH), and a signal line of SLD4-2 in a stated order.

FIGS. 7A to 9B are diagram illustrating a manufacturing method of the lighting inspection pad electrodes (PAD) and the gate voltage pad electrode (PADS) according to the embodiment of the present invention. In FIGS. 7A to 9B, FIGS. 7A, 8A, and 9A are plan views, and FIGS. 7B, 8B, and 9B are cross-sectional views.

Figures 7A, 7B:
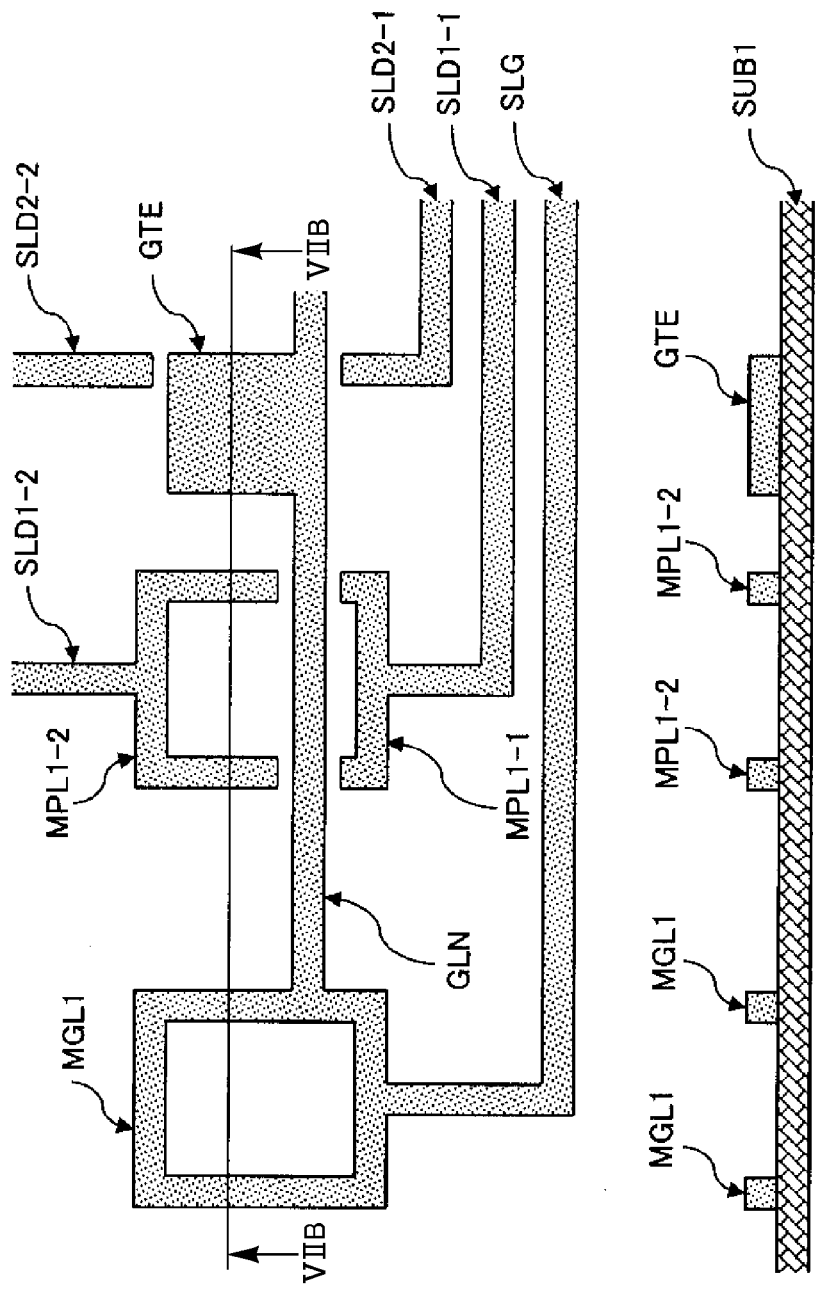
FIGS. 7A and 7B are diagrams illustrating a manufacturing method of the lighting inspection pad electrode and the gate voltage pad electrode according to the embodiment of the present invention.
Figure 8A:
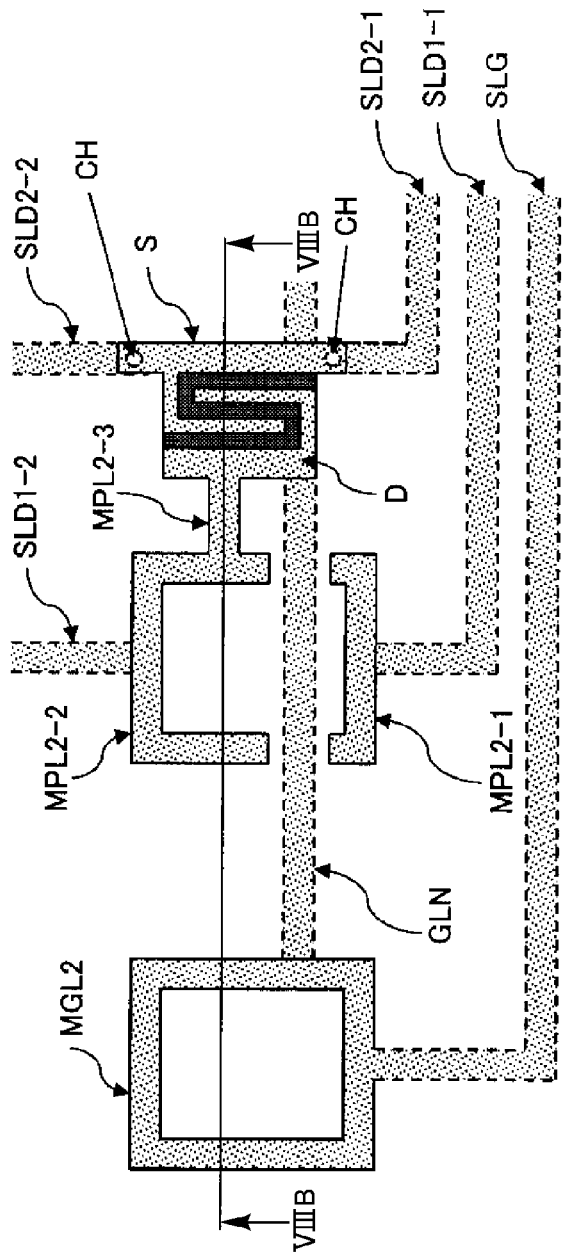
FIGS. 8A and 8B are diagrams illustrating the manufacturing method of the lighting inspection pad electrode and the gate voltage pad electrode according to the embodiment of the present invention.
Figure 8B:
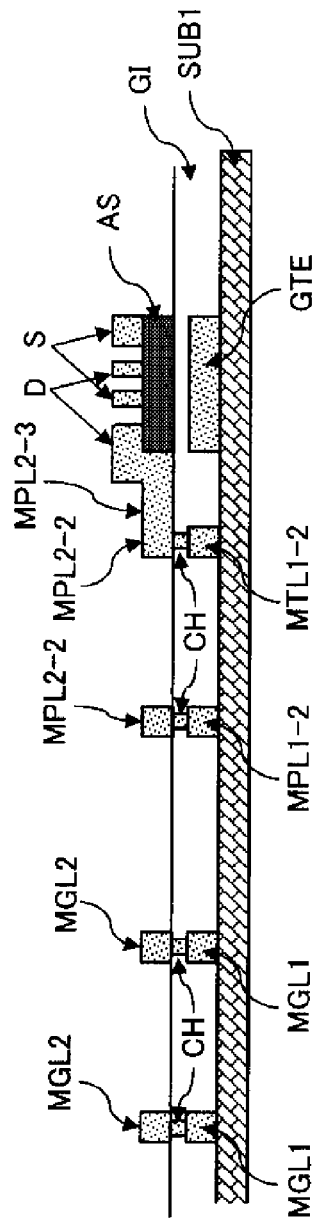

FIGS. 7B, 8B, and 9B illustrate a cross-section taken along a cut line VIIB-VIIB illustrated in FIG. 7A, a cross-section taken along a cut line VIIIB-VIIIB illustrated in FIG. 8A, and a cross-section taken along a cut line IXB-IXB illustrated in FIG. 9A, respectively.

Hereinafter, a description will be given of a detailed configuration of the lighting inspection pad electrodes (PAD) and the gate voltage pad electrode (PADS) according to the embodiment of the present invention with reference to FIGS. 7A to 9B.

As illustrated in FIGS. 7A and 7B, a looped first gate voltage conductive layer (MGL1) in a loop shape which edges an outer periphery of the gate voltage pad electrode (PADS) is formed of a metal layer (for example, Al) on the first substrate (SUB1).

The first gate voltage conductive layer (MGL1) is connected with a signal line (SLG) connected to the driver circuit (DRV), and to a gate line (GLN).

In this example, as illustrated in FIG. 7A, the gate line (GLN) extends under the area where the lighting inspection pad electrode (PAD) is formed, and is connected to a gate electrode (GTE) formed in the area where the switch (SW) is formed.

Also, a first lighting inspection conductive layer (MPL1-1) and a second lighting inspection conductive layer (MPL1-2) into which parts of a loop that edges an outer periphery of the lighting inspection pad electrode (PAD) divided by the gate line (GLN), are formed of a metal layer (for example, Al).

In this example, the first lighting inspection conductive layer (MPL1-1) is connected with the signal line (SLD1-1) connected to the driver circuit (DRV), and the second lighting inspection conductive layer (MPL1-2) is connected with the signal line (SLD1-2) connected to the integrated circuit 22A.

Also, the signal line (SLD2-1) connected to the driver circuit (DRV) and the signal line (SLD2-2) connected to the integrated circuit 22A are formed to sandwich the gate electrode (GTE) therebetween.

The signal lines (SLG, SLD1-1, SLD1-2, SLD2-1, SLD2-2), the gate line (GLN), and the gate electrode (GTE) are each formed of a metal layer (for example, Al).

Subsequently, after a gate insulating film (GI) is formed as illustrated in FIG. 8B, a second gate voltage conductive layer (MGL2) in a loop shape that edges an outer periphery of the gate voltage pad electrode (PADS) is formed of a metal layer (for example, Cr or Mo) on the gate insulating film (GI) as illustrated in FIG. 8A.

As illustrated in FIG. 8B, the second gate voltage conductive layer (MGL2) and the first gate voltage conductive layer (MGL1) are electrically connected to each other by the contact hole (CH). In this example, the contact hole (CH) is formed along an overall periphery of the second gate voltage conductive layer (MGL2).

Also, a third lighting inspection conductive layer (MPL2-1) and a fourth lighting inspection conductive layer (MPL2-2) into which parts of a loop that edges an outer periphery of the lighting inspection pad electrode (PAD) are divided by the gate line (GLN) as viewed from above, is formed of a metal layer (for example, Cr, Mo).

As illustrated in FIG. 8B, the third lighting inspection conductive layer (MPL2-1) and the first lighting inspection conductive layer (MPL1-1), as well as the fourth lighting inspection conductive layer (MPL2-2) and the second lighting inspection conductive layer (MPL1-2) are electrically connected to each other by the contact holes (CH). In this example, the respective contact holes (CH) are formed along the overall peripheries of the third lighting inspection conductive layer (MPL2-1) and the fourth lighting inspection conductive layer (MPL2-2). The third lighting inspection conductive layer (MPL2-1) and the fourth lighting inspection conductive layer (MPL2-2) may be together formed into a loop shape that edges the outer periphery of the lighting inspection pad electrodes (PAD).

Also, a semiconductor layer (AS) is formed on the gate insulating film (GI) so as to cover the gate electrode (GTE), and a source electrode (S) and a drain electrode (D) are formed of a metal layer (for example, Cr or Mo) on the semiconductor layer (AS).

In this embodiment, the source electrode (S) and the drain electrode (D) are formed into an interdigital shape in order to ensure a gate width.

In this example, one end of the source electrode (S) is electrically connected with the signal line (SLD2-1) connected to the driver circuit (DRV), through the contact hole (CH). The other end of the source electrode (S) is electrically connected with the signal line (SLD2-2) connected to the integrated circuit 22A, through the contact hole (CH).

Also, the drain electrode (D) is connected to the fourth lighting inspection conductive layer (MPL2-2) through a fifth lighting inspection conductive layer (MPL2-3) formed of a metal layer (for example, Cr or Mo).

Subsequently, after an interlayer insulating film (PAS) is formed as illustrated in FIG. 9B, a third gate voltage conductive layer (MGL3) formed of a transparent conductive layer (ITO) is formed as illustrated in FIG. 9A.

As illustrated in FIG. 9B, the third gate voltage conductive layer (MGL3) is electrically connected to the second gate voltage conductive layer (MGL2) through a contact hole (CH). In this example, the contact hole (CH) is formed along an overall periphery of the second gate voltage conductive layer (MGL2).

Also, as illustrated in FIG. 9A, a sixth lighting inspection conductive layer (MPL3) is formed of a transparent conductive layer (ITO).

As illustrated in FIG. 9B, the sixth lighting inspection conductive layer (MPL3) is electrically connected to the third lighting inspection conductive layer (MPL2-1) and the fourth lighting inspection conductive layer (MPL2-2) through contact holes (CH). In this example, the contact holes (CH) are formed along the overall peripheries of the third lighting inspection conductive layer (MPL2-1) and the fourth lighting inspection conductive layer (MPL2-2).

The invention made by the present inventors has been specifically described above on the basis of the embodiments. However, the present invention is not limited to the above embodiments, but can be variously changed without departing from the spirit of the invention. The present invention can be applied to not only the liquid crystal display device, but also other display devices such as an organic EL display device.

While there have been described what are at present considered to be certain embodiments of the invention, it will be understood that various modifications may be made thereto, and it is intended that the appended claims cover all such modifications as fall within the true spirit and scope of the invention.

What is claimed is:

1. A display device comprising:
an integrated circuit;
a first substrate on which a plurality of signal lines that respectively input control signals to the integrated circuit, and an inspection pad are formed; and
a driver circuit that is mounted on the first substrate, and is connected to the plurality of signal lines, wherein the plurality of signal lines include a first signal line and a second signal line adjacent to each other,
wherein the inspection pad is formed on the first signal line,
wherein the second signal line is connected to the inspection pad through a switch element, and
wherein, at the time of inspection, the switch element turns on, and the same control signal is input to the first signal line and the second signal line from the inspection pad.

2. The display device according to claim 1,
wherein the switch element is a thin film transistor formed on the first substrate,
wherein the first substrate further includes:
a gate voltage pad for inputting a gate voltage to be applied to a gate electrode of the thin film transistor; and
a gate line that is connected to the gate voltage pad to apply the gate voltage to the gate electrode of the thin film transistor, and
wherein, at the time of inspection, the gate voltage that turns on the thin film transistor is applied to the gate voltage pad to turn on the switch element.

3. The display device according to claim 2,
wherein the gate voltage pad includes:
a first gate voltage conductive layer in a loop shape that is formed of a metal layer on the first substrate;
a second gate voltage conductive layer in a loop shape that is formed of a metal layer on a gate insulating film, and is electrically connected to the first gate voltage conductive layer through a first contact hole; and
a third gate voltage conductive layer in a planar shape that is formed of a transparent conductive layer on an interlayer insulating film, and is electrically connected to the second gate voltage conductive layer through a second contact hole,
wherein the first gate voltage conductive layer is connected with a signal line connected to the driver circuit,
wherein on the first substrate the gate line is formed of a metal layer connected to the first gate voltage conductive layer, and
wherein the gate line is formed under the inspection pad.

4. The display device according to claim 3,
wherein the inspection pad includes:
a first inspection conductive layer and a second inspection conductive layer, each being formed of a metal layer on the first substrate, both being configured so that parts of a loop as viewed from above are divided by the gate line;
a third inspection conductive layer in a loop shape that is formed of a metal layer on the gate insulating film, and is electrically connected to a first inspection conductive layer and a second inspection conductive layer through a third contact hole; and
a fourth inspection conductive layer in a planar shape that is formed of a transparent conductive layer on the interlayer insulating film, and is electrically connected to the third inspection conductive layer through a fourth contact hole,
wherein the first signal line is divided into first and second portions by the gate line,
wherein the first inspection conductive layer is connected to the first portion of the first signal line, which is connected to the driver circuit, and
wherein the second inspection conductive layer is connected to the second portion of the first signal line, which is connected to the integrated circuit.

5. The display device according to claim 4,
wherein the thin film transistor includes:
a gate electrode that is formed on the first substrate, and is electrically connected to the gate line;
a semiconductor layer that is formed on the gate insulating film, and formed to cover the gate electrode; and a first electrode and a second electrode which are formed on the semiconductor layer, wherein the second electrode is connected to the third inspection conductive layer, wherein the second signal line is divided into first and second portions by the gate line, wherein one end of the first electrode is connected with the first portion of the second signal line which is connected to the driver circuit through a fifth contact hole, and wherein the other end of the first electrode is connected with a signal line of a portion of the second signal line which is connected to the integrated circuit through a sixth contact hole.

6. The display device according to claim 3, wherein the inspection pad includes:

a first inspection conductive layer and a second inspection conductive layer, each being formed of a metal layer on the first substrate, both being configured so that parts of a loop as viewed from above are divided by the gate line;

a third inspection conductive layer and a fourth inspection conductive layer, each being formed of a metal layer on the gate insulating film, both being electrically connected to the first inspection conductive layer and the second inspection conductive layer through seventh and eighth contact holes, respectively, both being configured so that parts of a loop as viewed from above are divided by the gate line; and a fifth inspection conductive layer in a planar shape that is formed of a transparent conductive layer on the inter-layer insulating film, and is electrically connected to the third inspection conductive layer and the fourth inspection conductive layer through a ninth contact hole, wherein the first signal line is divided into first and second portions by the gate line, wherein the first inspection conductive layer is connected to the first portion of the first signal line, which is connected to the driver circuit, and wherein the second inspection conductive layer is connected to the second portion of the first signal line, which is connected to the integrated circuit.

7. The display device according to claim 6, wherein the thin film transistor includes:

a gate electrode that is formed on the first substrate, and is electrically connected to the gate line;

a semiconductor layer that is formed on the gate insulating film, and formed to cover the gate electrode; and a first electrode and a second electrode which are formed on the semiconductor layer, wherein the second electrode is connected to the third or fourth inspection conductive layer, wherein the second signal line is divided into first and second portions by the gate line, wherein one end of the first electrode is connected with the first portion of the second signal line which is connected to the driver circuit through a tenth contact hole, and wherein the other end of the first electrode is connected with the second portion of the second signal line which is connected to the integrated circuit through an eleventh contact hole.

* * * * *